United States Patent
Narayanan et al.

(10) Patent No.: US 10,397,363 B2
(45) Date of Patent: Aug. 27, 2019

(54) SCORING USER CHARACTERISTICS

(71) Applicant: Facebook, Inc., Menlo Park, CA (US)

(72) Inventors: Chandrasekher Narayanan, Fremont, CA (US); Sundhar Ram Srinivasan, Mountain View, CA (US); Jeremy Hoon, San Francisco, CA (US); Yihua Liao, East Palo Alto, CA (US); Andrew Fabian Ledvina, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 1235 days.

(21) Appl. No.: 13/851,847

(22) Filed: Mar. 27, 2013

(65) Prior Publication Data

US 2014/0297740 A1 Oct. 2, 2014

(51) Int. Cl.
*H04L 29/08* (2006.01)
*G06Q 50/00* (2012.01)
*G06Q 10/10* (2012.01)
*G06Q 30/02* (2012.01)

(52) U.S. Cl.
CPC .......... *H04L 67/306* (2013.01); *G06Q 10/10* (2013.01); *G06Q 30/02* (2013.01); *G06Q 50/01* (2013.01)

(58) Field of Classification Search
CPC .............................. H04L 67/306; G06Q 10/10
See application file for complete search history.

(56) References Cited

U.S. PATENT DOCUMENTS

| 8,234,297 B2 | 7/2012 | He | |
|---|---|---|---|
| 8,844,031 B1* | 9/2014 | Bruckhaus | H04L 63/14 709/204 |
| 2007/0179943 A1* | 8/2007 | Hegerty | G06F 17/30958 |

(Continued)

FOREIGN PATENT DOCUMENTS

| JP | 2013506204 | 2/2013 |
|---|---|---|
| WO | 2010/026297 | 3/2010 |

OTHER PUBLICATIONS

Ian Rogers, Page Rank Explained (hereinafter PageRank), Dated by the Wayback Machine Apr. 1, 2012, p. 1-17.*

(Continued)

*Primary Examiner* — Backhean Tiv
*Assistant Examiner* — Joseph M Cousins
(74) *Attorney, Agent, or Firm* — Baker Botts L.L.P.

(57) ABSTRACT

In one embodiment, one or more computing devices access a social graph including nodes and edges between nodes; the nodes include user nodes corresponding to users of a social-networking system and concept nodes corresponding to concepts of the social-networking system; the computing devices identify first user nodes in the social graph corresponding to users having a particular user characteristic; the computing devices assign a characteristic score to each first user node; for a second user node without an assigned characteristic score, the computing devices also select neighboring user nodes connecting to the second user node based on affinity, and estimate a characteristic score for the second user node by aggregating iteratively characteristic scores while traversing the social graph from at least one first user node to the second user node through paths that each includes at least one selected neighboring node.

13 Claims, 5 Drawing Sheets

(56) References Cited

U.S. PATENT DOCUMENTS

| | | | |
|---|---|---|---|
| 2008/0005096 A1 | 1/2008 | Moore | |
| 2008/0189380 A1* | 8/2008 | Bosworth | H04L 67/22 709/207 |
| 2011/0213801 A1 | 9/2011 | He | |
| 2012/0166433 A1 | 6/2012 | Tseng | |
| 2012/0299925 A1 | 11/2012 | Najork | |
| 2013/0218965 A1* | 8/2013 | Abrol | H04L 67/22 709/204 |
| 2013/0254305 A1* | 9/2013 | Cheng | H04L 51/32 709/206 |
| 2013/0317941 A1* | 11/2013 | Stoll | G06Q 30/0609 705/26.35 |
| 2014/0280570 A1* | 9/2014 | Sutton | G06Q 50/01 709/204 |

OTHER PUBLICATIONS

International Search Report and Written Opinion for International Application PCT/US2014/031553, dated Aug. 4, 2014.
Notification of Reasons for Rejection for JP Application No. 2016-505520 (with English translation), dated Feb. 13, 2018.
AU Office Action received for Patent Application No. 2014241680, dated Nov. 21, 2018.

* cited by examiner

SCORING USER CHARACTERISTICS

TECHNICAL FIELD

This disclosure generally relates to social graph.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

Particular embodiments describe methods for inferring users of a social-networking system who likely have a particular user characteristic. Particular embodiments may first use machine-learning algorithms or other suitable methods to identify in a social graph of the social-networking system a set of user nodes corresponding to users with a particular user characteristic and assign a score to each identified user node. Particular embodiments may then use the identified user nodes as seeds to estimate scores for other user nodes in the social graph. A user node's score may be estimated based on that user node's connection in the social graph to user nodes with assigned scores. The value of the estimated score for the user node may indicate a likelihood of the user node's corresponding user having the particular user characteristic.

DESCRIPTION OF EXAMPLE EMBODIMENTS

Figure 1:
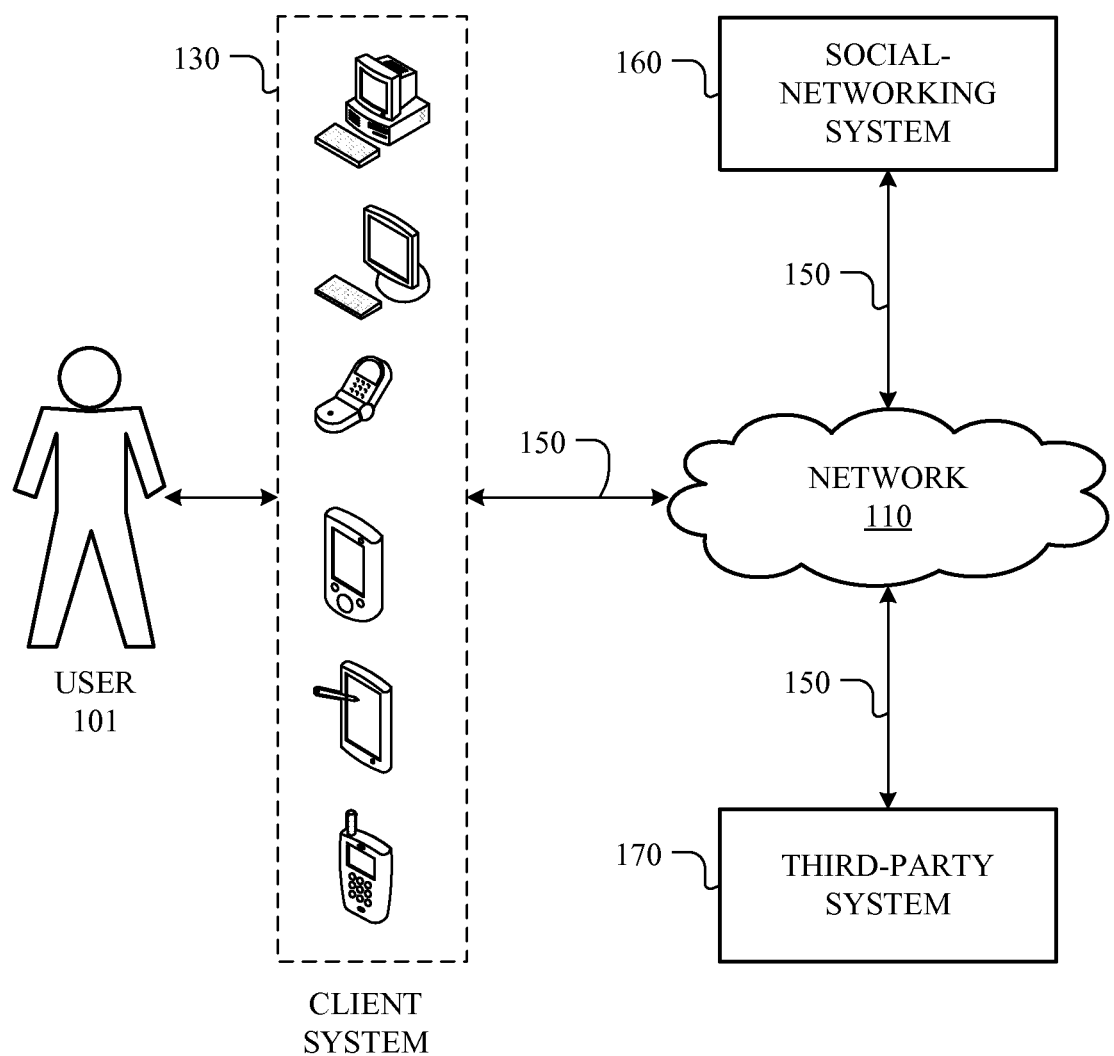
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 170 may be a network-addressable computing system that can host websites or applications. Third-party system 170 may generate, store, receive, and send third-party system data, such as, for example, web pages, text, images, video, audio, or applications. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
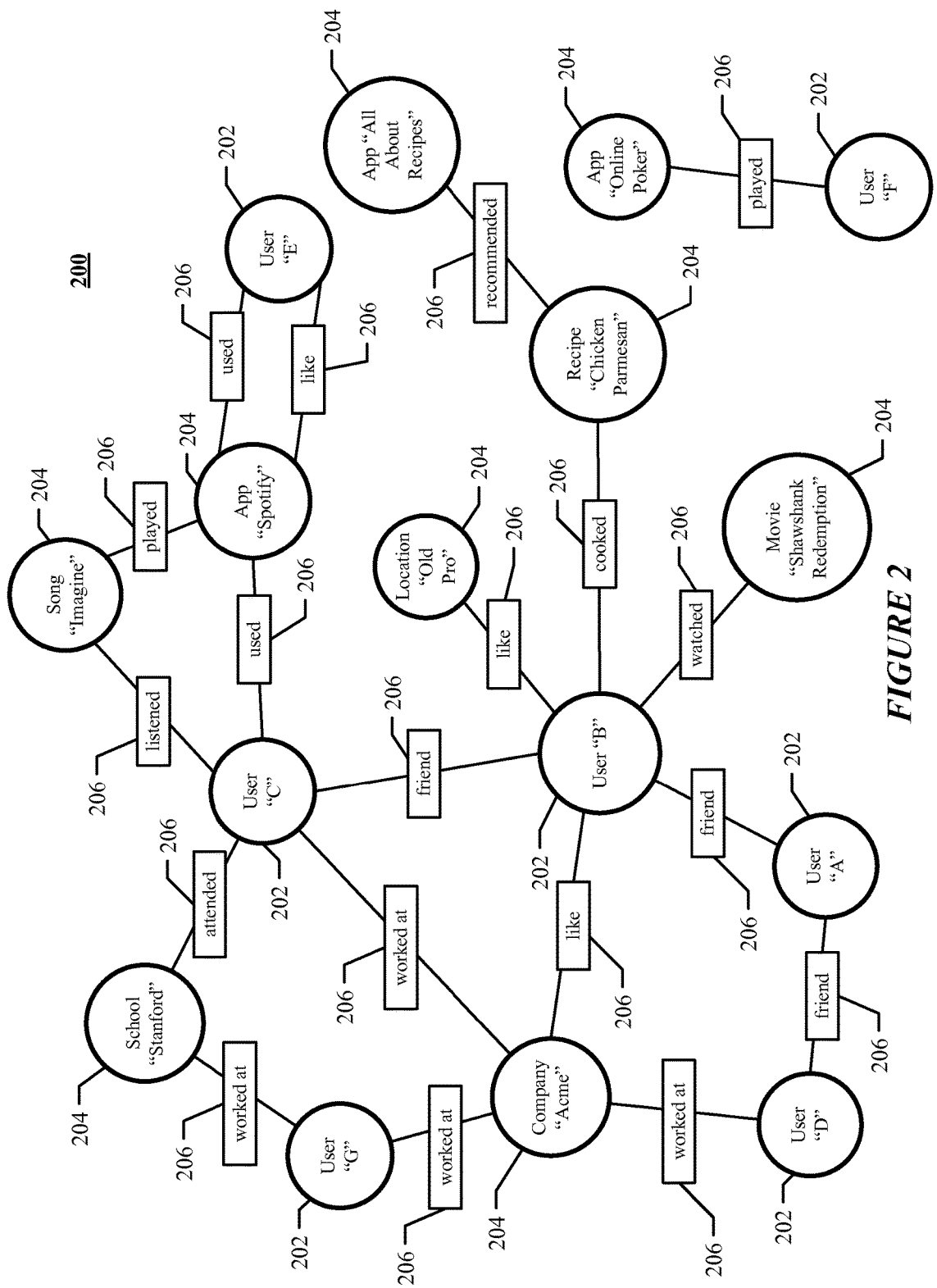
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In addition, the degree of separation between any two nodes is defined as the minimum number of hops (or edges) required to traverse the social graph from one node to the other. A degree of separation between two nodes can be considered a measure of relatedness between the users or the concepts represented by the two nodes in the social graph.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, a social-networking system may identify one or more users with a particular user characteristic. A user characteristic may correspond to a quality of a user's activities in the social-networking system. For example, the social-networking system may identify a user as a bad-behaving user or a bad user if the user often perform undesirable or bad activities in the social-networking system. A bad user may often violate terms of service or community standard of the social-networking system, such as sending out spam messages, using a fake identify, frequently posting bad or prohibited content (e.g., profanity, copy-right material), or frequently sending friend requests to users that the bad user unlikely knows in the real world (e.g., users living in a different continent from the bad user). The social-networking system may identify a user as a good-behaving user or a good user if the user has not had undesirable activities in the social-networking system for over a pre-determined period of time (e.g., 3 years). The social-networking system may identify a user as a good user if the user frequently performs desirable activities in the social-networking system, such as posting high-quality content (e.g., well-composed content, content shared by many other users, or content receiving positive comments), or having high-quality interaction with other users or concepts in the social-networking system.

A user characteristic may also correspond to a user's attitude toward a concept of the social-networking system. For example, the social-networking system may identify a user with a positive attitude toward a concept (e.g., "Tide" brand in laundry detergent products) if the user likes a concept page for the concept, subscribes to newsfeed for the concept, often has positive comments on content related to the concept, or often recommends the concept (e.g., "Tide" products) to other users in the social-networking system. For another example, the social-networking system may identify a user with a negative attitude toward a concept if the user un-subscribes to newsfeed for the concept, or often has negative comments or postings about the concept.

The social-networking system may use pre-determined rules, statistics algorithms, or machine-learning algorithm with training data sets to identify users with a particular user characteristic. However, the social-networking system may identify only a small set of users with a particular user characteristic due to limited information available for identifying the particular user characteristic. Meanwhile, it is desirable to determine additional users who likely have the particular user characteristics. The social-networking system may improve overall user experience with the social-networking system by determining users who likely have a particular user characteristics. For example, the social-networking system may want to determine users likely having a positive attitude toward a particular concept such that the social-networking system may recommend pages or advertisements related to the particular concept to these users, or re-order search results for a query submitted by one of these additional users based on the search results' relevancy to the particular concept. For another example, the social-networking system may want to determine users who are likely bad users, such that the social-networking system may filter out or block content posted to the social-networking system by these likely bad users, or to deactivate or reduce social-networking functionalities available to these likely bad users.

Particular embodiments describe methods for inferring users who likely have a particular user characteristic. Particular embodiments may identify in a social graph a set of user nodes corresponding to users with a particular user characteristic and assign a characteristic score to each identified user node. Particular embodiments may infer other user nodes corresponding to users who likely have the particular user characteristic by using the identified user nodes as seeds to estimate characteristic scores for other user nodes in the social graph. For example, a user node's characteristic score may be estimated based on that user node's connection in the social graph to user nodes with assigned characteristic scores. The value of an estimated characteristic score for a user node may indicate a likelihood of the user node's corresponding user having the particular user characteristic.

Figure 3:
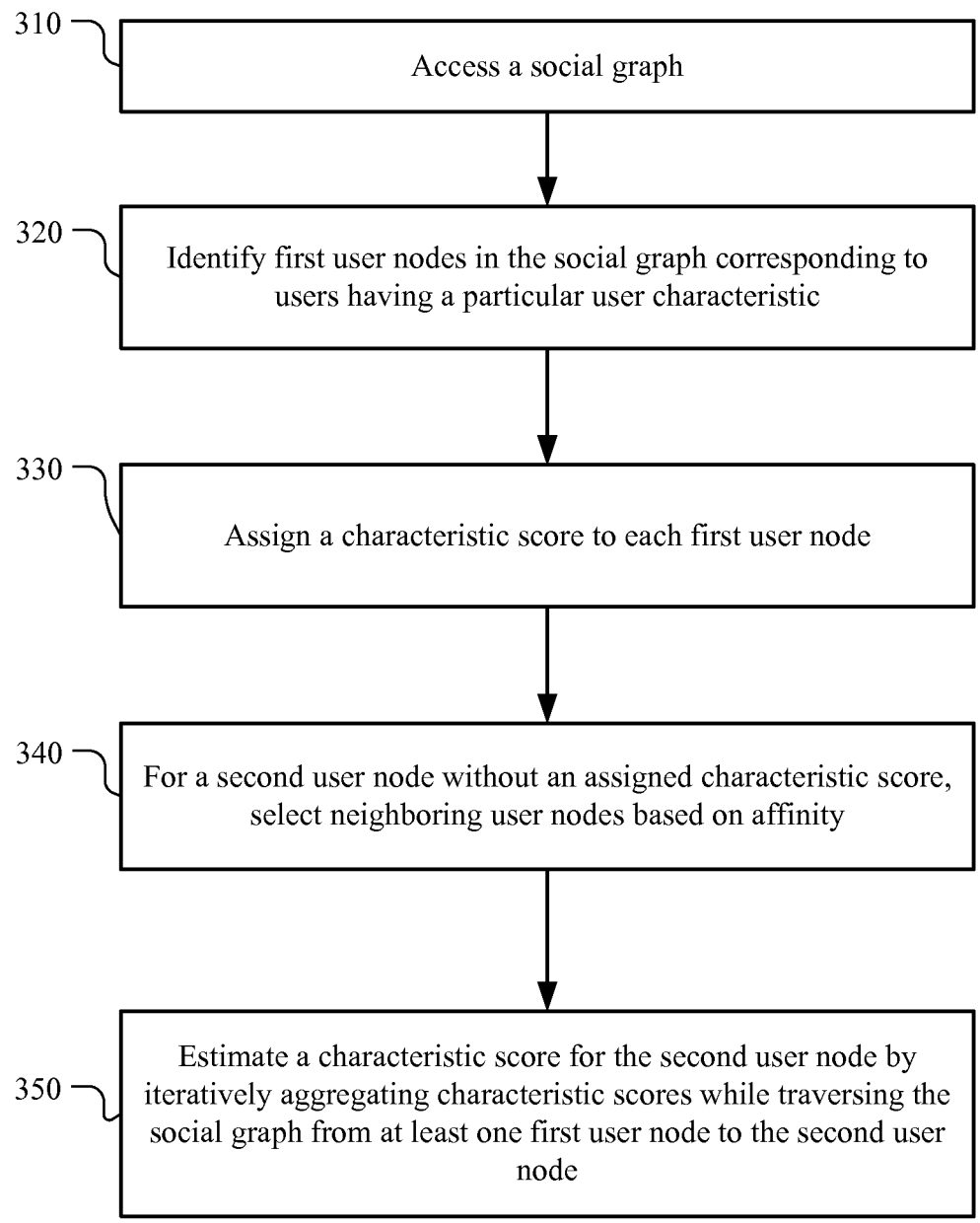
FIG. 3 illustrates an example method for scoring user characteristics.

FIG. 3 illustrates an example method 300 for scoring user characteristics. The method 300 may be implemented by one or more computing devices (e.g., servers) of a social-networking system. The method 300 may also be implemented by one or more computing devices (e.g., of a third-party system) accessing a social graph of the social-networking system using an application programming interface (API) provided by the social-networking system. The method 300 may begin at step 310. In particular embodiments, at step 310, one or more computing devices may access a social graph of the social-networking system. The social graph may comprise a plurality of nodes and a plurality of edges between nodes. The nodes may comprise user nodes corresponding to users of the social-networking system and concept nodes corresponding to concepts of the social-networking system, such as illustrated by the example social graph 200 illustrated in FIG. 2. Note that the number of nodes and edges and the amount of data held by the social graph may be very large. For example, a social graph maintained by FACEBOOK, INC. of Menlo Park, Calif. may have more than $10^8$ user nodes and more than $10^{10}$ friendship edges between the user nodes.

In particular embodiments, at step 320, the computing devices may identify one or more first user nodes corresponding to users having a particular user characteristic. For example, the computing devices may identify first user nodes corresponding to one or more good users in the social-networking system. The computing devices may identify users having a particular user characteristic based on machine learning algorithm with training data sets as described before. Particular embodiments contemplate any suitable methods for identifying users having a particular user characteristic.

In particular embodiments, at step 330, the computing devices may assign to each first user node a characteristic score. A characteristic score may be an integer, a real number, or any suitable value representing the particular user characteristic. For example, the computing devices may assign a characteristic score of 1 to each first user node corresponding to an identified good user.

For a second user node without an assigned characteristic score, particular embodiments may estimate a characteristic score for the second user node based on the second user node's connection in the social graph to one or more first user nodes with assigned characteristic scores. That is, particular embodiments may estimate a characteristic score for the second user node by traversing the social graph between a first user node (with an assigned characteristic score) and the second user node. Particular embodiments may traverse only through the second user node's neighboring nodes that have high affinity with the second user node, as high-affinity neighboring nodes may have more relevant interaction with the second user node. That is, instead of traversing the whole social graph in any possible paths (e.g., random walks), particular embodiments may "prune" the social graph for the second user node (thus reducing a number of paths traversed) such that only connections through the high affinity neighboring nodes may be considered for estimating a characteristic score of the second user node.

In particular embodiments, at step 340, for at least a second user node without an assigned characteristic score, the computing devices may select one or more neighboring user nodes connecting to the second user node based at least in part on affinity between each selected neighboring user node and the second user node. The computing devices may select the neighboring user nodes that have the highest affinity with the second user node. As described earlier, affinity between two user or user nodes may be measured by an affinity coefficient or coefficient. For example, the computing devices may rank the second user's neighboring user nodes based on their respective coefficients with the second user, and select a number (e.g., 10) or a percentage (e.g., 20%) of top-ranked neighboring user nodes. Particular embodiments contemplate any suitable methods for selecting neighboring user nodes connected to the second user node based on affinity.

In particular embodiments, at step 350, the computing device may estimate a characteristic score for the at least second user node by aggregating iteratively characteristic scores while traversing the social graph from at least one of the first user nodes (with assigned characteristic scores) to the second user node. The at least first user node may be one or more hops away from the second user node in the social graph. Meanwhile, the traversing may comprise one or more paths each comprising at least one of the selected neighboring user nodes. That is, each path may pass through at least one of the selected neighboring user nodes (that has high affinity with the at least second user node). The computing devices may aggregate (e.g., adding to a sum) iteratively characteristic scores of one or more user nodes along the each path. Here, the characteristic scores of the user nodes along the each path may comprise assigned or estimated characteristic scores.

The computing devices may aggregate iteratively characteristic scores while traversing the social graph from at least one of the first nodes (with assigned characteristic scores) to the second user node by weighting each characteristic score (of each user node along the traversed path) based at least in part on a number of edges connecting to the each characteristic score's corresponding user node in the social graph. For example, an i-th user node's estimated characteristic score at the k-th iteration $C_{i,k}$ may be calculated using Equation (1) as follows:

$$C_{i,k} = \Sigma (1/O_j) \cdot C_{j,k-1} \qquad (1)$$

In Equation (1), $C_{j,k-1}$ is an estimated characteristic score at the (k−1)-th iteration (i.e., the previous iteration step) for the j-th neighboring user node of the i-th user node. The summation is made over all j-th neighboring user nodes of the i-th user node. Each term in the summation corresponds to an edge between the i-th user node and a j-th neighboring user node that is part of at least one particular path traversed in the social graph. Additionally, each j-th neighboring user node is a selected high-affinity neighboring node as described earlier. $O_j$ is the number of connections for the j-th neighboring user node. That is, each j-th neighboring user node's characteristics score is weighted by (as inversely proportional to) the number of connections of the j-th neighboring user node. Here, a higher number connections of the j-th neighboring user node may indicate less interaction or influence between the j-th neighboring user node and the i-th user node. Particular embodiments contemplate any suitable methods for weighting a characteristic score for a user node of a path traversed in the social graph. In particular embodiments, the computing devices may apply Equation (1) to all user nodes in the social graph. The computing devices may apply Equation (1) to all user nodes iteratively for a pre-determined number of times (e.g., 5 iterations).

Moreover, in particular embodiments, each path traversed in the social graph for estimating a characteristic score for the second user node may be a directional path following one or more directional edges. In particular embodiments, the computing devices (or another computing process of the social-networking system) may determine a direction of an edge between two user nodes. The computing devices may determine an edge between user node A (of user A) and user node B (of user B) is directed from user node A to user node B if user B has more influence on user A (i.e., user A is a "follower" of user B). For example, the computing devices may determine that user B has more influence on user A if user A subscribes to user B's newsfeed and often performs actions on content generated by B (e.g., making comments on user B's postings, tagging photos posted by user B), while user B is a "passive" connection of user A (e.g., user B has no interaction with content generated by user A in the past 3 months). In this case, user A may have a higher coefficient value with respect to user B's content, while user B may have a lower coefficient value with respect to user A's content. The computing devices may determine an edge's direction based on unsymmetrical values of coefficients associated with the edge. Particular embodiments contemplate any suitable methods for determining a direction of an edge between two user nodes in the social graph. In particular embodiments, the computing devices may apply Equation (1) to each user node in the social graph based on directions of edges connecting to the each user node. For example, the summation in Equations (1) is made over all j-th neighboring user nodes, each with an edge connection directed from the each j-th neighboring user node to the i-th user node. $O_j$ is the number of edges for the j-th neighboring user node that each edge is directed away from the j-th neighboring user node.

Figure 4:
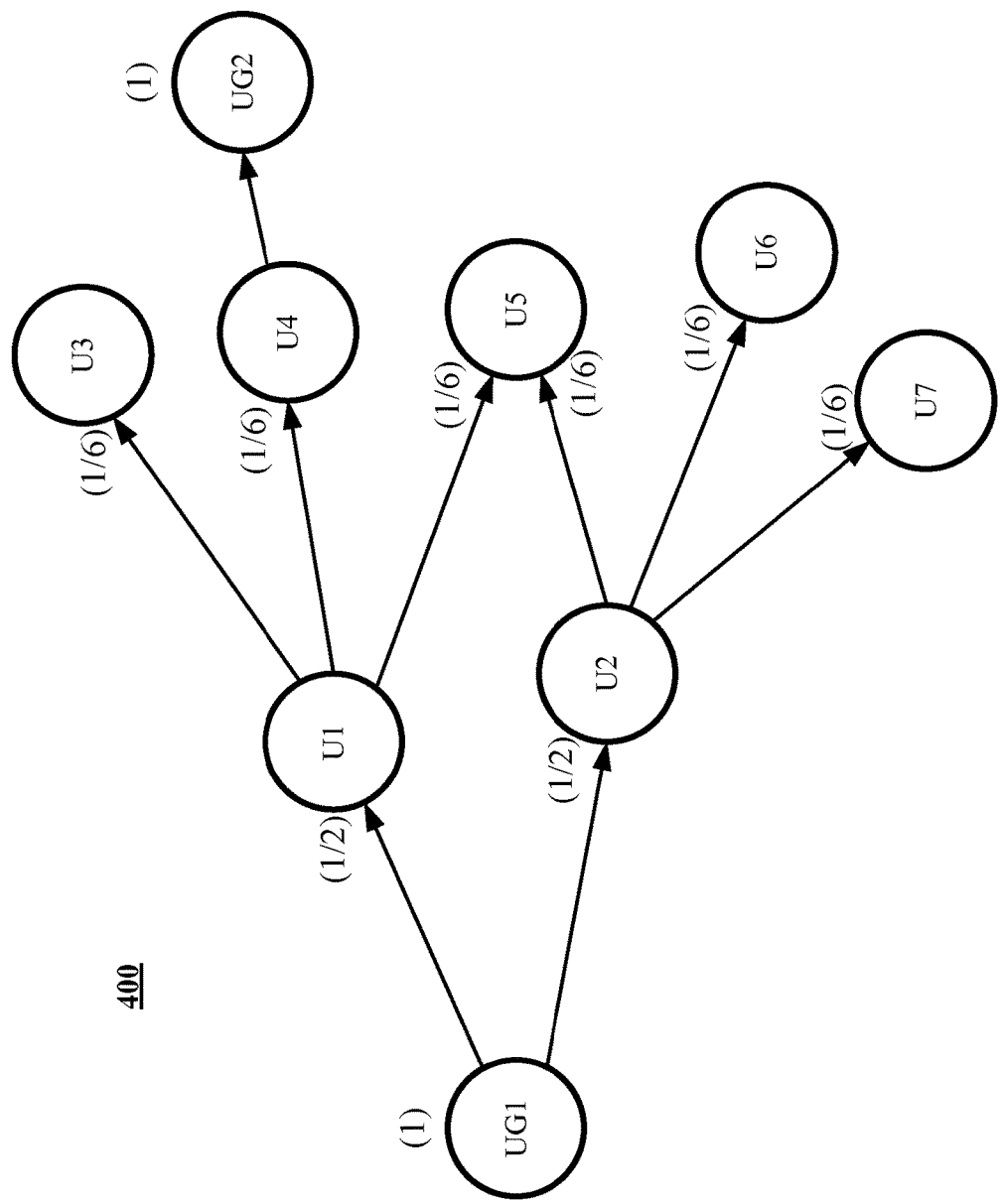
FIG. 4 illustrates an example calculation of characteristic scores.

FIG. 4 illustrates an example calculation of characteristic scores based on the method 300 and Equation (1). In FIG. 4, an example social graph 400 includes user nodes UG1 and UG2 (corresponding to users UG1 and UG2, respectively), each having an assigned characteristic score of 1, corresponding to a particular user behavior. Meanwhile, user nodes U1, U2, . . . , and U7 (corresponding to users U1, U2, and so on, respectively) do not have assigned characteristic scores. For example, UG1 and UG2 are good users, while U1, U2, . . . , and U7 are users without previously known quality as a good user. For illustrative purposes, only edges corresponding to connections to high-affinity neighboring nodes are shown in FIG. 4. Additionally, the edges are directional. For example, the edge between nodes UG1 and U1 is directed from UG1 to U1, indicating that user UG1 is a follower of user U1. Here, calculation of characteristic scores may follow the directional edges.

For example, an estimated characteristic score for U1 may be calculated as having a value of 1/2, as there is one incoming edge from UG1, while UG1 has two outgoing edges. An estimated characteristic score for U3 may be calculated as having a value of 1/6, as there is one incoming edge from U1, while U1 has three outgoing edges. Here, the estimated characteristic score for U3 is a weighted aggregated characteristic score calculated along a directional path UG1-U1-U3.

Similarly, an estimated characteristic score for U4 may be calculated as having a value of 1/6, as there is one incoming edge from U1, while U1 has three outgoing edges. Here, the estimated characteristic score for U4 is a weighted aggregated characteristic score calculated along a directional path UG1-U1-U4. Also note that the assigned characteristic score of 1 for UG2 is not included in estimating U4's characteristic score as the edge between U4 and UG2 is directed from U4 to UG2.

An estimated characteristic score for U2 may be calculated as having a value of 1/2, as there is one incoming edge from UG1, while UG1 has two outgoing edges. An estimated characteristic score for U6 may be calculated as having a value of 1/6, as there is one incoming edge from U2, while U2 has three outgoing edges. Here, the estimated characteristic score for U6 is an weighted aggregated characteristic score calculated along a directional path UG1-U2-U6. Similarly, an estimated characteristic score for U7 may be calculated as a weighted aggregated characteristic score along a directional path UG1-U2-U7, resulting in a value of 1/6.

An estimated characteristic score for U5 may be calculated as having a value of 1/3 (sum of 1/6 and 1/6), as there are one incoming edge from U1 (which has three outgoing edges), and another incoming edge from U2 (which has three outgoing edges). That is, the estimated characteristic score for U5 is a weighted aggregated characteristic score calculated along a directional path of UG1-U1-U5 and along another directional path of UG1-U2-U5.

Figure 5:
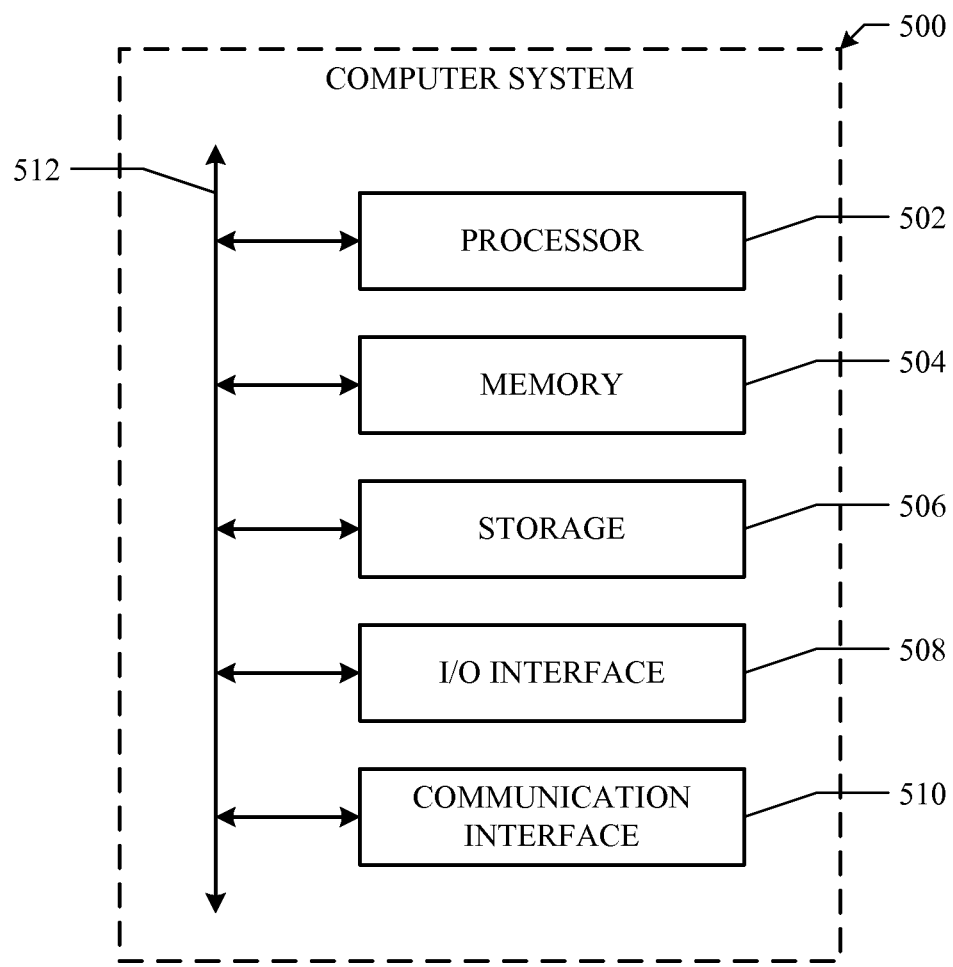
FIG. 5 illustrates an example computer system.

In the example of FIG. 4, the value of an estimated characteristic score of a user node may indicate a likelihood that the user node's corresponding user may have the particular user characteristic as being a good user. For example, the estimated characteristic score of 1/3 for U5 may indicate a 1/3 of probability that user U5 is a good user (given a good user UG1 having an assigned characteristic score of 1). Since each estimated characteristic scores in FIG. 5 is calculated along one or more directional edges, while each directional edge is directed from a "follower" user node to an "influencer" user node, the value of each estimated characteristic score may indicate an effect if the each estimated characteristic score's corresponding user leaves the social graph. For example, if user U5 leaves the social graph (thus the social-networking system), there may be a 1/3 probability that the good user UG1 may leave the social-networking system.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them.

During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
accessing, by one or more computing devices, a social graph comprising a plurality of nodes and a plurality of edges between nodes, the plurality of nodes comprising user nodes corresponding to users of a social-networking system;
identifying, by one or more computing devices, a first user node that is not assigned a characteristic score representing a particular characteristic of the user corresponding to the first user node;
identifying, by one or more computing devices, one or more second neighboring nodes, each second neighboring node having a characteristic score representing the particular characteristic of the user corresponding to that node, each second neighboring node connected in the social graph to the first user node by at least one edge;
selecting, by one or more computing devices, one or more of the one or more identified second neighboring nodes;
determining, by one or more computing devices, for each selected second neighboring node and for each of one or more other user nodes connected in the social graph to the second neighboring node by an edge, an affinity of the user corresponding to the second neighboring node for the user of the other user node;
determining, by one or more computing devices, for each second neighboring node:
a first number of edges representing connections such that the user corresponding to the second neighboring node has a high affinity for the user corresponding to the other user node, wherein a high affinity for the user corresponding to the other user node is determined by:
ranking the other neighboring user nodes based on respective affinity coefficients;
selecting only a number of top-ranked other user's neighboring user nodes or
selecting only a percentage of top-ranked other user's neighboring user nodes;
assigning, by one or more computing devices, the first user node a characteristic score comprising a sum of:
the characteristic score of each selected second neighboring node divided by the first number of edges corresponding to that second neighboring node,
wherein the characteristic score represents the likelihood that the first user will violate a terms of service of the social-networking system;
and the method further comprises limiting, based on the characteristic score a functionality of the social network for the first user.

2. The method of claim 1, wherein the edges connecting the second neighboring node to other user nodes in the social graph comprise directional edges directed away from the second neighboring node.

3. The method of claim 1,
wherein determining the first number of edges further includes:
determining, for each of the other user nodes connected in the social graph to the second neighboring node by an edge, an affinity of the user corresponding to that other user node for the user corresponding to the second neighboring node,
based on a determination that the affinity of the user corresponding to the second neighboring node for the user corresponding to the other user node is greater than the affinity of the user corresponding to the other user node for the user corresponding to the second neighboring node, including the edge connecting the second neighboring node to the other user node in the first number of edges.

4. The method of claim 1,
wherein determining the first number of edges further includes:
determining, for each of the other user nodes connected in the social graph to the second neighboring node by an edge, an affinity of the user corresponding to that other user node for the user corresponding to the second neighboring node,
based on a determination that the user corresponding to the other user node has a high affinity for the user corresponding to the second neighboring, including the edge connecting the second neighboring node to the other user node in the first number of edges.

5. The method of claim 1, further comprising deactivating, based on the characteristic score assigned to the first user, the social-network account associated with the first user.

6. The method of claim 1,
wherein the method further comprising:
blocking, based on the characteristic score assigned to the first user, content posted to the social-networking system by the first user.

7. The method of claim 1, wherein selecting one or more of the one or more identified second neighboring nodes comprises:

determining, for each identified second neighboring node, an affinity of the user corresponding to the second neighboring node for the user corresponding to the first node;

by one or more computing devices, selecting the second neighboring nodes based on a determination that the user corresponding to the second neighboring node has a high affinity for the user corresponding to the other first node.

8. One or more computer-readable non-transitory storage media embodying software, that when executed by one or more processors, cause the one or more processors to: access a social graph comprising a plurality of nodes and a plurality of edges between nodes, the nodes comprising user nodes corresponding to users of a social-networking system;

identify a first user node that is not assigned a characteristic score representing a particular characteristic of the user corresponding to the first user node;

identify one or more second neighboring nodes, each second neighboring node having a characteristic score representing the particular characteristic of the user corresponding to that node, each second neighboring node connected in the social graph to the first user node by at least one edge;

select one or more of the one or more identified second neighboring nodes;

determine for each selected second neighboring node and for each of one or more other user nodes connected in the social graph to the second neighboring node by an edge, an affinity of the user corresponding to the second neighboring node for the user of the other user node;

determine for each second neighboring node:
  a first number of edges representing connections such that the user corresponding to the second neighboring node has a high affinity for the user corresponding to the other user node, wherein a high affinity for the user corresponding to the other user node is determined by:
    ranking the other neighboring user nodes based on respective affinity coefficients;
    selecting only a number of top-ranked other user's neighboring user nodes or
    selecting only a percentage of top-ranked other user's neighboring user nodes;
  assign the first user node a characteristic score comprising a sum of: the characteristic score of each selected second neighboring node divided by the first number of edges corresponding to that second neighboring node,
  wherein the characteristic score represents the likelihood that the first user will violate a terms of service of the social-networking system;

and the software further cause the one or more processors to: limit, based on the characteristic score, a functionality of the social network for the first user.

9. The media of claim 8, wherein the edges connecting the second neighboring node to other user nodes in the social graph comprise directional edges directed away from the second neighboring node.

10. The media of claim 8,
wherein the software further cause the one or more processors to:
deactivate, based on the characteristic score assigned to the first user, the social-network account associated with the first user.

11. A system comprising: one or more processors;
and a memory coupled to the one or more processors comprising instructions executable by the one or more processors and that cause the one or more processors, when executing the instructions, to:
access a social graph comprising a plurality of nodes and a plurality of edges between nodes, the nodes comprising user nodes corresponding to users of a social-networking system;
identify a first user node that is not assigned a characteristic score representing a particular characteristic of the user corresponding to the first user node;
identity one or more second neighboring nodes, each second neighboring node having a characteristic score representing the particular characteristic of the user corresponding to that node, each second neighboring node connected in the social graph to the first user node by at least one edge;
select one or more of the one or more identified second neighboring nodes;
determine for each selected second neighboring node and for each of one or more other user nodes connected in the social graph to the second neighboring node by an edge, an affinity of the user corresponding to the second neighboring node for the user of the other user node;
determine for each second neighboring node:
  a first number of edges representing connections such that the user corresponding to the second neighboring node has a high affinity for the user corresponding to the other user node, wherein a high affinity for the user corresponding to the other user node is determined by:
    ranking the other neighboring user nodes based on respective affinity coefficients;
    selecting only a number of top-ranked other user's neighboring user nodes or
    selecting only a percentage of top-ranked other user's neighboring user nodes;
  assign the first user node a characteristic score comprising a sum of: the characteristic score of each selected second neighboring node divided by the first number of edges corresponding to that second neighboring node,
  wherein the characteristic score represents the likelihood that the first user will violate a terms of service of the social-networking system; and
further when executing the instructions, the one or more processors: limit, based on the characteristic score, a functionality of the social network for the first user.

12. The system of claim 11, wherein the edges connecting the second neighboring node to other user nodes in the social graph comprise directional edges directed away from the second neighboring node.

13. The system of claim 11,
wherein when executing the instructions further, the one or more processors:
deactivate, based on the characteristic score assigned to the first user, the social-network account associated with the first user.

* * * * *